United States Patent [19]

Garcia et al.

[11] 3,748,650

[45] July 24, 1973

[54] INPUT/OUTPUT HARDWARE TRACE MONITOR

[75] Inventors: Leslie C. Garcia; John D. McNeill, both of Poughkeepsie; Theodore A. Papanastasiou, Hyde Park; Norman K. Powers, Wappingers Falls; William E. Tjonpiangi, Poughkeepsie, all of N.Y.

[73] Assignee: International Business Machines Corporation, Armonk, N.Y.

[22] Filed: Aug. 21, 1972

[21] Appl. No.: 282,529

[52] U.S. Cl. .............................................. 340/172.5

[51] Int. Cl. .............................................. G06f 3/00

[58] Field of Search .................................. 340/172.5

[56] References Cited

UNITED STATES PATENTS

| | | | |
|---|---|---|---|
| 3,582,901 | 6/1971 | Cochrane et al. | 340/172.5 |
| 3,611,311 | 10/1971 | Andrews | 340/172.5 |
| 3,618,031 | 11/1971 | Kennedy et al. | 340/172.5 |
| 3,688,274 | 8/1972 | Cormier et al. | 340/172.5 |
| 3,693,163 | 9/1972 | Johnson et al. | 340/172.5 |

*Primary Examiner*—Harvey E. Springborn
*Attorney*—Owen L. Lamb et al.

[57] ABSTRACT

A hardware monitor capable of capturing information sent between a central processing unit and input/output devices. Captured information is time stamped and formatted with command control status, data transfer count and typical text information. The monitor contains a format storage medium which is segmented into N storage partitions. Each storage partition is unique insofar as it is associated with each I/O device. A one-for-one relationship reserves the Nth partition exclusively for the Nth I/O device and the partition has sufficient storage space to store the command control, status, time of day, internal control and typical text information relating to the Nth I/O device.

An operation initiated to or from the Nth I/O device causes time of day information to be stored in the time stamp position of the Nth partition. This time stamp furnishes exact information on when the I/O device operation was initiated. The type of operation associated with the Nth I/O device is captured by storing the actual command control and responding status information in their respective positions within the storage partition. In addition, the total transferred data to or from the I/O device is counted and this count value is stored with the control information.

15 Claims, 9 Drawing Figures

Patented July 24, 1973 3,748,650

7 Sheets-Sheet 1

Patented July 24, 1973 3,748,650

7 Sheets-Sheet 3

Patented July 24, 1973 3,748,650

7 Sheets-Sheet 7

INPUT/OUTPUT HARDWARE TRACE MONITOR

BACKGROUND OF THE INVENTION

1. Field of the Invention

The invention relates to data processing systems and more particularly to apparatus for measuring the performance of the system.

2. Description of the Prior Art

In the past, device measurement has been accomplished by means of measurement probes. The probes are connected to various parts of logic in the central processing unit. The problem is that the probes become a part of the system itself and can cause system failures. In addition, operator intervention is necessary so that the correct points to probe in the logic are determined.

In order to solve this problem, an input/output device measurement interface was created in which permanent probe points are brought out to an interface. This approach to the problem has been successful in producing a universally adaptable measurement tool inasmuch as there is little agreement or standardization as to which probe points should be brought out in the interface.

The monitoring of a computer system involves the accumulation of time increments of activity, or incidents to specify the activities. The degree of precision depends upon the procedure used and the interpretation of the data collected. In the past, the human element played a disproportionate role in making routine measurements. Generally speaking, the more data collected during a fixed time period, the better the chances of meaningful systems measurements. In most monitors, the data that is collected is tagged or identified and after tagging, the data is recorded on a medium so that a skilled person can interpret and analyze the data to provide the system performance analysis.

The primary object of this invention is to provide a computer monitor which can be used universally by simple, standard attachment to the computer.

Another object of this invention is to provide a computer monitor which collects data from an input/output channel and central processing units simultaneously to thereby provide more freedom for skilled persons.

It is a further object of this invention is provide a computer monitor that sorts and logs collected data in a format that will submit to computer aided evaluation to thereby reduce operator intervention to a minimum.

It is a further object of this invention to provide a channel measurement tool which attaches to an input/output channel in the same manner as an I/O control unit.

It is a further object of this invention to provide an apparatus for monitoring all I/O devices simultaneously in conjunction with the monitoring of the main computer with a minimum of apparatus.

Briefly, the above objects are accomplished in accordance with the invention by providing means for capturing data and commands passing over a standard I/O interface connecting a data channel to I/O devices. The captured information is time-stamped, formatted and transferred to a format storage. The format storage is segmented on a one-for-one basis with each I/O device. The data related to the computer functions to be timed or counted are collected in each format storage segment, tagged for identification, and then recorded on some appropriate medium for later performance analysis.

The invention has the advantage that it collects data from both the CPU and the I/O areas of the system simultaneously.

The invention has the further advantage that its attachment is transparent to the system so that it adds minimum distortion to system performance.

The invention has the further advantage that since it attaches to the I/O interface the same as any other control unit, test set-up time is minimized.

The foregoing and other objects, features and advantages of the invention will be apparent from the following more particular description of the preferred embodiments of the invention, as illustrated in the accompanying drawings.

In the Drawings

FIG. 1 is a diagram of a computer system in which the invention is embodied;

DESCRIPTION

Figure 4:
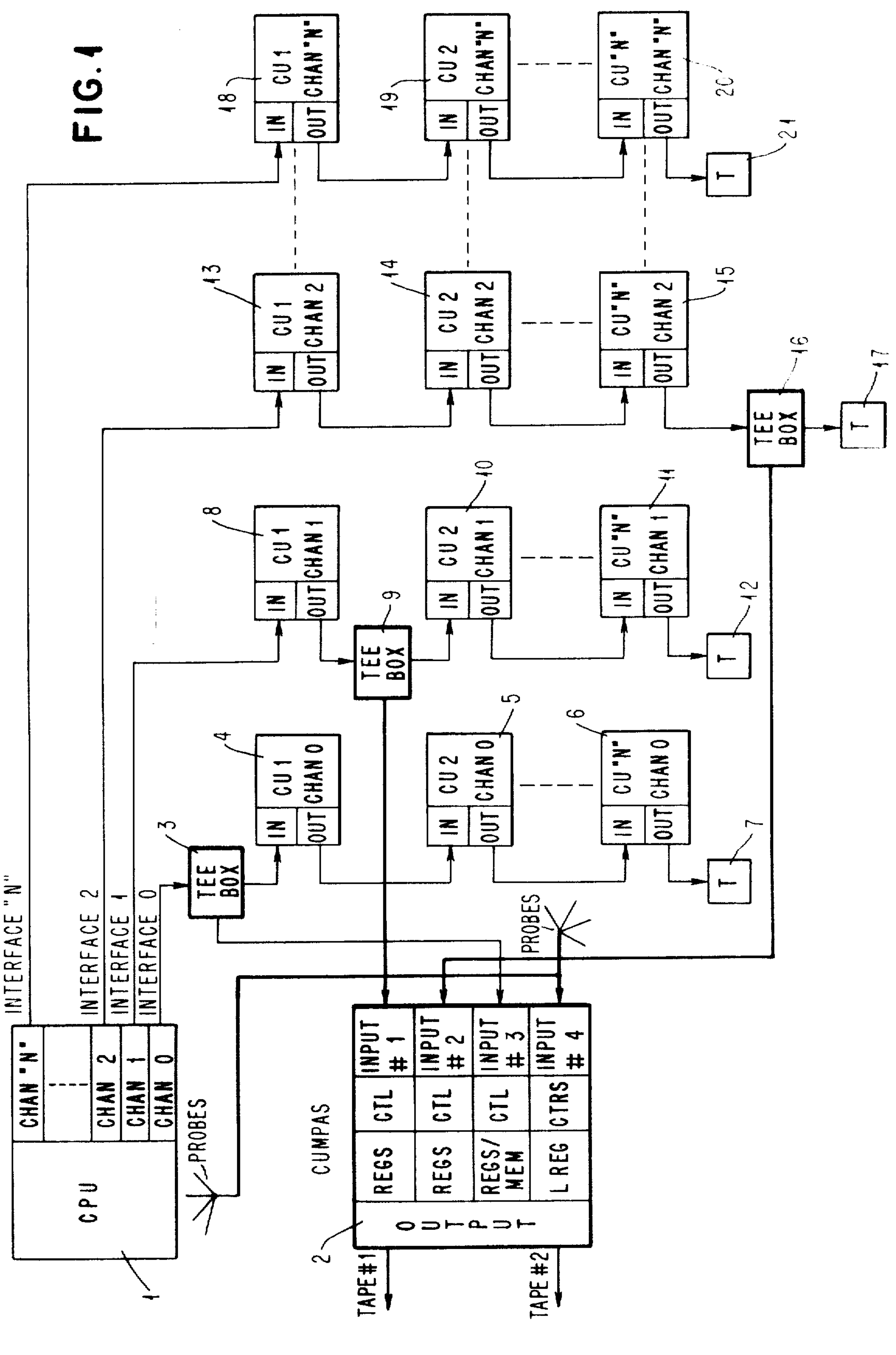
FIG. 4 is a diagram of the profile channel input No. 4 of CUMPAS.

FIG. 1 represents a typical data processing system, a CPU 1 having N possible channels. Each channel output connects to control units using a standard interface as fully described in Beausoleil et al. U.S. Pat. No. 3,336,582. Using channel 0 as an example, the standard interface exits the channel and enters the first control unit 4, exits the first control unit, enters the second 5 and so on. Finally it is terminated 7. In FIG. 1, each of the N possible channels on the CPU are connected in similar fashion to N banks of control units. They are represented by items 4, 5, 6, 8, 10, 11, 13, 14, 15, 18, 19 and 20. The unique aspect of this invention is that this typical data processing system is being monitored by the channel utilization monitor (CUMPAS). CUMPAS interconnects with the data processing system by means of Tee boxes. Tee boxes are placed in series with the control unit string on each of three channels, channels 0, 1 and 2. The embodiment of FIG. 1 has the capability of handling two selector channels (CUMPAS inputs No. 1 and No. 2), and one multiplexer channel (CUMPAS input No. 3). It is possible to send selector channel information into the multiplexer input No. 3, however, the converse does not hold true.

A second unique aspect of this invention is the physical location of Tee boxes. Tee box 3, channel 0, is first in line in the control unit chain. On channel 1, a second Tee box 9 is second in line and on channel 2, the third Tee box 16 is last. This exemplifies the fact that in a data processing system, Tee boxes do not necessarily have to be first, second, third or any particular location in a control unit chain. A Tee box must appear somewhere in a channel to control unit chain for CUMPAS monitoring. The Tee box is added in series with each channel to control unit chain to be monitored. There is no interruption of data going between the control units and a channel. The Tee box permits all signals to pass through, however, it does sense, power and transmit the interface signals to CUMPAS via cables. One Tee box transmits data to one of the CUMPAS inputs. Channel 0 Tee box 3 transmits data to input number 3 of CUMPAS.

Channel 1 Tee box 9 transmits data to input number 1 of CUMPAS and the third T box 6 of channel 2 transmits data to CUMPAS input number 2. Thus, three channels are being monitored simultaneously by CUMPAS.

Referring to CUMPAS 2, input number 1 and input number 2 accept selector channel information while input number 3 is designed to handle multiplex-type data. A multiplex channel must be connected to input number 3. The CUMPAS has a fourth input data path called the profile input which does not directly monitor channel chains. It accepts monitor probe inputs which can be placed throughout a data processing system to monitor functions on the CPU, control units, or devices. Profile information can be captured and is used to supplement I/O data.

FIG. 1 illustrates the CUMPAS 2 data flow. Each of the four inputs to CUMPAS have receiving capabilities, that is, inputs 1, 2 and 3 receive data from a Tee box. This received data drives the logic within CUMPAS. Each of the three inputs, 1, 2 and 3, has control circuitry which interprets the tag signals coming from the Tee boxes and captures the bus information in registers. To illustrate, control logic within CUMPAS makes a decision based on the tag data as to which bus, the in bus or the out bus, has the data; identifies the type of data, and places it in specified registers within CUMPAS. Each of the input paths has registers for temporary-type storage. The multiplexer input of CUMPAS, input number 3, in addition to registers, has a memory. The memory is necessary because this channel is capable of capturing multiplexed-type information from 256 different devices all receiving or transmitting interleaved data across the channel interface. Unlike selector channels, the CUMPAS multiplexer input must keep track of multiple device data at any one instant of time.

Input number 4, the profile section, contains eight counters and a 12 bit live register.

The output storage of CUMPAS consists of two FIFO (First in/first out) shift registers which allows a block of data to be accumulated prior to tape outputting. Two tapes are available.

Figure 2:
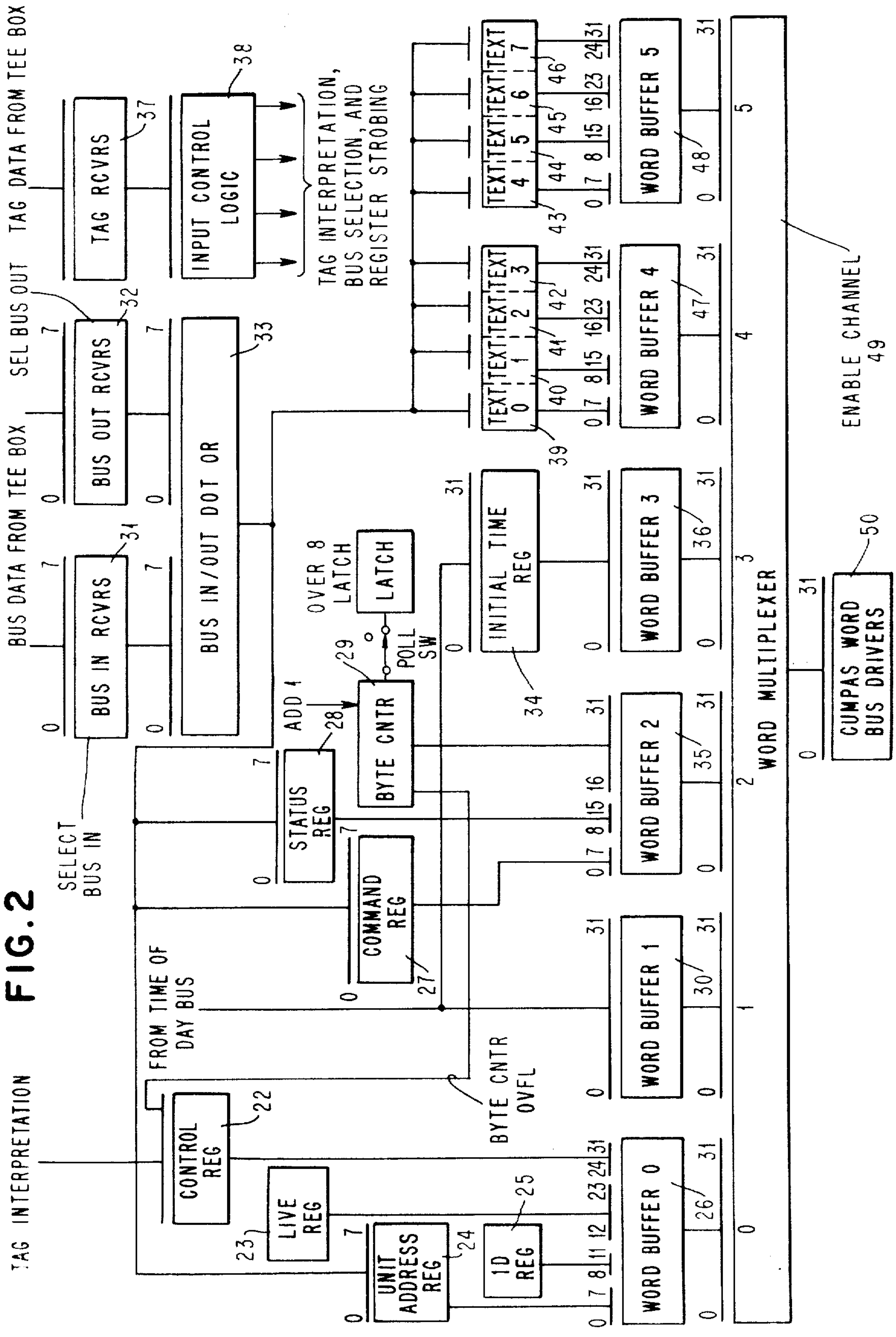
FIG. 2 is a detailed diagram of input No. 1 of CUMPAS, a selector channel.
Figure 3:
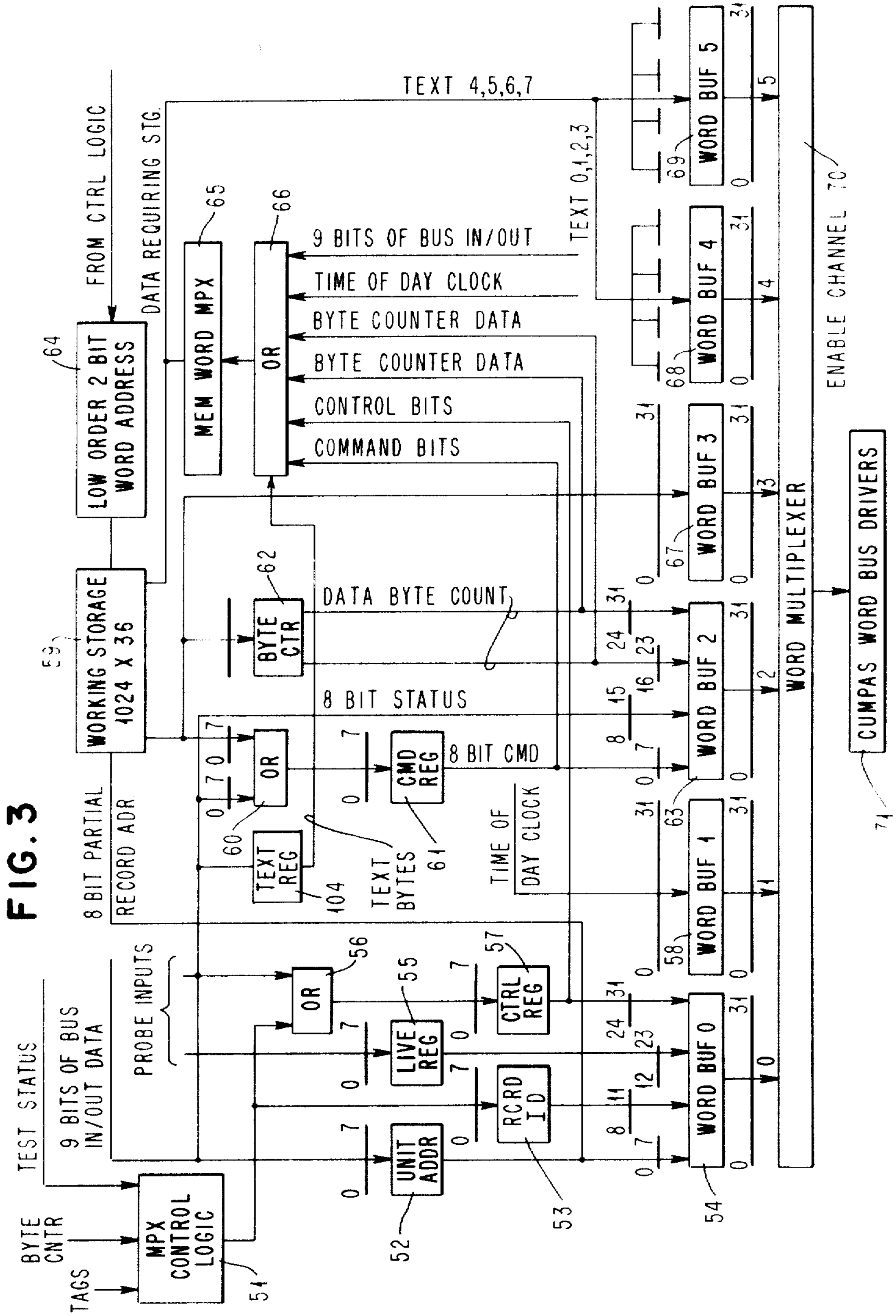
FIG. 3 is a detailed diagram of input No. 3 of CUMPAS, a multiplex channel.
Figure 4:
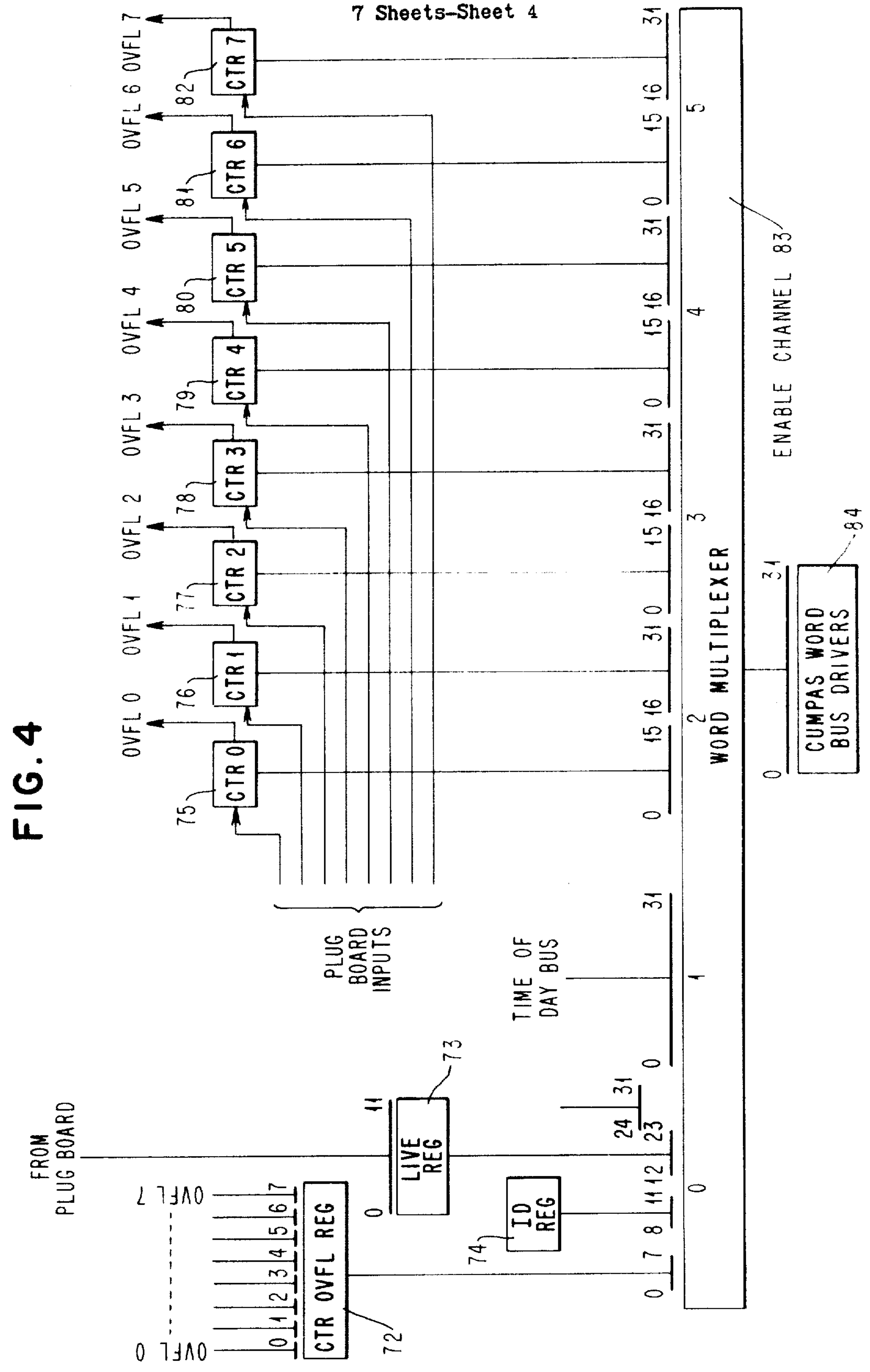
Figure 9:
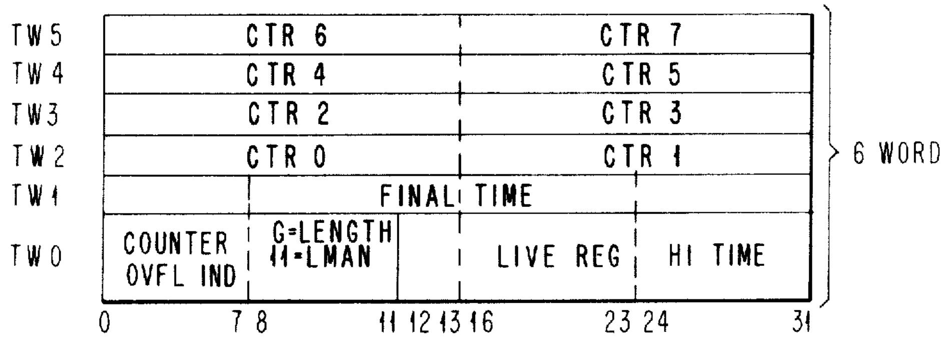
FIG. 9 is a table of a profile record.
Figure 7:
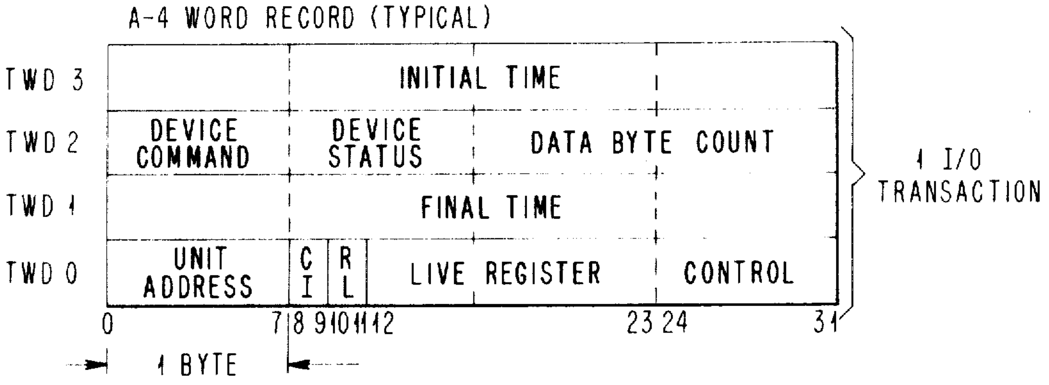
FIG. 7 is a table of a typical 4-word channel.
Figure 8:
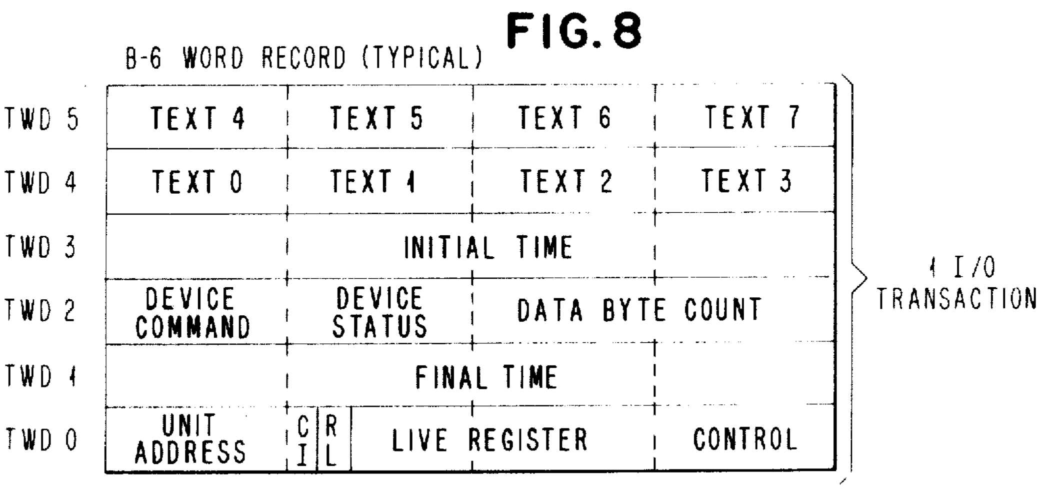
FIG. 8 is a table of a typical 6-word channel record.

The format of output records is shown in FIGS. 7 and 8 for the selector or multiplex channels of FIGS. 2 and 3 respectively, and in FIG. 9 for a profile channel.

FIG. 7 shows a typical four word record, there being no text data associated with it. FIG. 8 shows a six word record, which is identical to FIG. 7 with two words for storing eight bytes of text.

Tape words (TWD) 0 – 3 are identical for both formats. TWD 1 stores the contents of unit address register, the channel identification (CI), the record length (RL), contents of the live register, and contents of the control register. TWD 2 stores the final time from the word buffer 1. TWD 2 stores device command from the command register, device status from the status register, and the data byte count from the byte counter. TWD 3 stores the initial time from the initial time register.

FIG. 2 shows the input number 1 data flow for attachment to a selector channel. The same diagram applies to input number 2 which also is for a selector channel.

In FIG. 2, the data being transmitted to and from the Tee box is received by bus in or bus out receivers 31, 32. Tags are also received in the same manner into tag receivers 37. Bus in and bus out contain all the information going between the control units and the CPU under control of the tagged signals. The bus in 31, bus out 32, and the tag 37 receivers are differential amplifiers which convert the low level signals coming from a Tee box to the standard five volt levels. The receivers 31 and 32 are dot ORed together at block 33. Output 33 is either the bus in or bus out signals depending upon which set of receivers is selected.

The input control logic determines which bus is selected out of block 33. Block 38 is control logic for CUMPAS. Tag signals are interpreted by this input control logic section, 38. The in bus or the out bus is selected depending upon which tag is active. The appropriate registers in CUMPAS are strobed thus transferring the correct bus to the appropriate register. This is the capture technique that CUMPAS uses; interpret the tag, select the bus, strobe into or out of the appropriate register.

A typical control sequence that occurs on the channel interface follows. Initial selection starts when the channel sends an address out and a hold out signal to all control units. Since the Tee box is in series with all control units, the Tee box senses address out and hold out tags, transmits these signals to CUMPAS where input control logic 38 interprets these tags as initial selection mode. Address out, hold out has an associated unit address on the out bus. This sequence selects the out bus receivers 32. The output of the bus in/bus out dot 33 is available to all of the registers and the sequence address out/hold out strobes or transfers the data from bus out to the unit address register, 24. The unit address or device address is now captured in register 24.

Control register 22 is used for control information. The address out/hold out sequence is an initial selection mode and one bit in this control register is set to indicate initial selection. This is used for data reduction purposes. Control register 22 has various bits of information that are useful in software reduction of CUMPAS data. The control unit then acknowledges the address out/hold out sequence by presenting Operational In and Address In as a verification that the device or control unit is available. The channel issues a command by raising the tag command out. At the bus out receivers 32, the 8 bit (1 byte) command being sent to the control units is present. The tag input control logic 38 interprets Command out by strobing the Command Register 27 and selecting the bus out receivers 32. At this point, the unit address of the device and the channel command have been captured.

The next part of the interface sequence is the presentation of status. Assume that status coming back is zero which means the device or control unit is not busy and is available. (Initial status other than zero, would indicate that although the unit is present, for some reason it is not available, i.e., busy state.) The control unit presents to the channel status in and on the bus in receivers which are selected by input control logic 38, all zeros are transferred to register 28 the status register. Now we have captured the device address, channel command and status. If the channel is to transfer data, a data sequence is started. The device raises service in and the channel presents service out. Each time a service out/service in sequence occurs, a data byte is placed on one of the buses. The tags interprets service in/service out and by examining the command in register 27, determines if it is a write command. If it is, bus out would be selected. Service in/service out then starts capturing the actual data being transferred from the channel to the control unit.

The byte counter 29 has associated with it text registers 39, 40, 41, 42, 43, 44, 45 and 46. Under control of the byte counter, each byte of text (up to a total of eight) is stored in the appropriate register. When service in/service out occurs, assuming a write command and the bus out receiver is selected, the byte counter being zero strobes text zero register 39 with the information on bus out 32 which is the first text byte. After the data is transferred into text zero register 39, the byte counter, 29, is advanced by one. The next service in/service out sequence would transfer bus out 31 to text number one register 40. Service in/service out continues with the byte counter pointing to which text register should receive the text byte. At the seventh service in/service out sequence, the byte counter contains a count of 7. Service in/service out strobes the eighth text word into register 46 the text 7 register), and advances the byte count to eight. At this point, the capturing of text is discontinued. This is done by the "over 8 Latch" which is turned on at a count of eight to inhibit further reading into the text registers. As a result, no more text is captured after the first 8 bytes. However, a poll override feature is provided by the poll switch. When teleprocessing terminals are being monitored, it is desirable to be able to capture the last 8 bytes of data rather than the first 8 bytes. This allows capturing the returned address in response to the polling sequence. When the poll switch is opened, the over eight latch will not be turned on when the counter 29 reaches a count of eight. The text registers continue to store bytes, with the ninth byte over-writing byte zero, etc. The text registers thus hold the last 8 bytes receives. In either the polling or non-polling case, the counter does continue to count the total number of text bytes being sent to a particular device. The byte counter will count up to 64 thousand bytes of information. The next service in/service out causes the byte counter to reset to zero. The counter overflowing 64 thousand sets of bit in control register 22. Between the byte counter 29 and the control register 22, 128 thousand bytes of information can be indicated.

At the beginning of a transaction, when address out/-hold out sequence captures unit address, an initial time register 34 is used for time stamping the beginning of a transaction. The beginning of a transaction is defined as the beginning of the selection sequence.

There is a special clock built into CUMPAS which is five bytes in length and counts in binary. Four bytes are bussed to all channels. The fifth byte is used for "high time" and is indicated in the final status. The time of day bus can be sampled at any instant of time.

After all the text information has been sent, an ending sequence takes place. An ending sequence is the occurrence of a status in signal having non-zero status. For example, a device has received or has sent the correct number of data bytes or has completed the particular command that it was instructed to do. The status register 28 would now have something other than zero status due to the fact that the tag input control logic 38 has received status in.

Input control logic 38 has received status in, selected the in bus receivers 31, brought the data through bus in/out dot OR gate 33 and the status register 28. Once the status register contains other than zero, the end of the transaction is signalled to CUMPAS. In summary, the beginning of a transaction is the presentation of unit address and the end of a transaction is any non-zero status response. The end of a transaction is time stamped by transferring the time of day bus into word buffer number 1, register 30. Now it is known when the transaction was started and when the transaction ended within a microsecond resolution.

Non-zero status causes the following events. All register information is transferred into the word buffers, registers 26, 35, 36, 47 and 48 at the bottom of FIG. 2. Word buffers are latches which provide temporary storage for all accumulated information in the registers. It is necessary to provide this temporary storage since the formatted transaction must be placed into a shift register and the registers and controls be made available for the next transaction.

In FIG. 2, register 22, the control register, contains information necessary for data reduction. Definition of these bits follows: bit 0 is an indicator of initial selection mode. This bit being a 1, when a transaction is complete, indicates the transaction was initiated by the channel. If initial selection is caused by a device, the bit would be a zero. This type of transaction would be called a device initiated transaction.

Bit 1 is set to 1 if CUMPAS detected that the channel attempted to select a device and the result was select in indicating the device was not present. Bit 2, if set to a 1, indicates that the command in that transaction is chained to another command. Bit 3, if set to a 1, indicates that the status has been stacked by the channel. Bit 4, if set to a 1, indicates that control unit disconnect was detected. Bit 5, if set to a 1, indicates control unit busy sequence detected. Bit 6, if set to 1, indicates that the byte counter 29 exceeded its maximum of 64 thousand bytes for this transaction. The last bit, 7, is a spare and undefined.

In summary, the control register contains pertinent information in addition to the unit address, command, status, byte count, and text data that was captured. The additional bits of information assist in the evaluation of the transaction.

The live (L) register 23 is a 12 bit storage register. Each of the bits can be individually set by probe inputs which is useful when external information is sent as part of the transaction. The 12 bits might be monitor call type instruction information (software hooks) or the particular storage protect key which that channel (channel key) is using at the instant the transaction was captured.

The ID register 25 is a four bit register. The first 2 bits of the ID register, identify the CUMPAS channel which created the record. The record, once created, is sent from the internal CUMPAS channel to a shift register and buffered into a tape record and then to tape. On tape many records of data are recorded, each one being an I/O transaction. Since all I/O transactions from different channels have the same format, it is necessary to identify which channel captured that transaction. The first 2 bits of the identification register are encoded to indicate that the record (the ID becomes part of the record) was created by a particular channel. The first two bits being zero indicates that the record was created by the multiplexer input. If the first two bits are 01, or binary 1, it indicates that the first selector created the record. A binary 2 would indicate the second selector created the record and a binary 3 would indicate the record was created by the profile or fourth CUMPAS input path.

The next two bits of the identification register 25 indicates how many words a particular record contains. There can be 6 or 4 word records on tape. If a particular I/O transaction which has been captured contains 6 words, the length code or the identification register 25 will contain in the last 2 bit locations a binary 01. If it contains 10, it indicates the record is only 4 words long. An "11" length code indicates that it is a special padding record. This is to alert the software or program reduction user, that the record is not caused by an I/O to or profile transaction but is created in order ti fill the tape output buffer with an even number of words.

Since a transaction over the channel interface may or may not involve data transfers, a 4 word record is provided to save space in the tape output buffer.

If the transaction or the record created contains text, CUMPAS will create a full 6 word record. The length code alerts the data reduction program to how long the record is. The data reduction program then knows the next four words are in this record if the length code is a 4 or that the next 6 words on tape are part of the same record if the length code is a 6. The length code is set if the byte counter is 0 at the end of a transaction. That is, at the end of a transaction, the byte counter is tested for zero. If it is zero, a 4 word record is created. However, if at the end of a transaction, the byte counter contains a value other than zero, a six word record is created, and text information is also transferred. Thus, the byte counter not only directs the storing of text data, it determines whether the record is 4 or 6 words.

Word multiplexer 49 takes the outputs from the word buffer storage, (registers 26, 30, 35, 36, 47 and 48) and multiplexes them one word at a time to drive the CUMPAS word bus 50. All channels are tied together in this manner. Each of the word bus drivers are dot ORed with the word bus drives of all channels to form a common bus. A particular channel is attached to the bus by means of an enable channel signal sent to the word multiplexer.

FIG. 3 is a data flow diagram for the multiplexer I/O channel input to CUMPAS. Working storage 59 is a 1,024 word, 36 bit, memory. Working storage, a basic part of the multiplexer channel input is necessary because, the multiplexer channel can transmit or receive data from many devices in an interleaved fashion. The multiplexer channel may send 1 byte of data to a device, then disconnect that device, send a byte of data to a second device, and return to the first device with another byte, and so on between many devices sending multiple bytes of information. One of these devices will terminate a transaction with non-zero status, indicating it has completed the previous command. This causes CUMPAS to generate a logical record.

This interleave operation is unlike the selector channel in that once the selector channel starts a selection sequence, it transmits or receives all data without disconnecting the device and awaits receipt of non-zero status.

A multiplexer I/O channel handles information from many devices in an interleaved manner. This interleaving of data transmission with multiple devices causes CUMPAS to keep track of partially completed records in working storage. These partial records must be retrieved and updated with each reselection of a device. A device which terminates a transaction, by presenting non-zero status, has within working storage all necessary information to form a CUMPAS record. Upon termination of a transaction, the portion of working storage for that device is entered into the word buffers 54, 58, 63, 67, 68, 69 and eventually into the blocking buffer for permanent recording on tape. Working storage 59, the heart of the multiplex channel, is one difference between the multiplex channel and the selector channels of FIG. 2.

Working storage is a 1,024 word 36 bit memory divided into 256 (4 word) partitions. A partition of working storage is accessed by the 8 bit unit address register 52. When a device address is captured in register 52, that device address becomes the region address within working storage. These 8 bits or region address are the high order address of working storage. A region contains four words. Words within a region are addressed by the low order 2 address bits, block 64. These 2 bits are generated by the multiplexer control logic 51. The 256 regions in working storage contain the partial records from each of the possible 256 devices which can be connected to a multiplexer channel.

Working storage functions as follows. The transaction begins with a unit address selection where tags (address out/hold out) is captured by the tag receivers in the multiplexer channel. This address out/hold out tag causes bus out data to be stored in the unit address register 52. Register 52 containing the unit address is used to address one of the 256 regions of working storage. If the unit address for example, is 09 then region 09 of working storage is accessed. Since this is the beginning of the transaction, the initial time is sampled. The time of day bus information is ORed in block 66 of FIG. 3 and sent to register 65 which is the data input into memory. The low order two address bits from the CUMPAS control logic 51 are set to 01 and initial time is stored into region 09, word 1. Prior to that access, all the information contained in region 09 was zero. When unit address is captured, word 0 of that region is accessed and transferred into the command 61, control 57 and the byte count registers 62.

Initial time is currently in its storage location word 1. Command, control and byte count registers contain the contents of word 0. From bus out when command out tag is energized, the command is captured and transferred to OR gate 60 and is strobed by the multiplex control logic 51 (the tag interpretation area) into the command register 61. In a normal sequence of events, the status in tag is presented next. Assume zero status (i.e., normal sequence), zero status is not captured in CUMPAS by the multiplexer channel. The next event on the interface is a service in/service out tag sequence interpreted by the MPX control logic 51 as a data byte transfer. When the first service in/service out tag occurs, the byte counter in CUMPAS is zero. It is necessary to capture the first data byte into the region of storage associated with that unit address. The first data byte (byte 0) is stored in word byte 0. Word 2 of each region contains the first four text bytes. Word 3 of any region contains the next four text bytes. Essentially working storage is 256 registers storing all the information about 256 possible transactions. The working storage maintains an update capability for all transactions that are in process and contains, at any given instant, a summary of activity for each device.

The occurrence of service in/service out tag sequence captures the data in the text register 104. From the text register the data is sent to OR gate 66 and is gated into memory word multiplexer block 65. Under control of the byte counter (the byte counter sitting at zero for the first byte of text), the unit address is used to access the region of working storage associated with that device and the low order two bits would be formed into an address of 10, for storing the first 4 bytes of text. Word 2 of that region is accessed and a text byte is placed in byte zero. After the first text byte is stored in byte 0 of word 2, the byte counter is advanced by 1. During the next service in/service out tag sequence the byte counter contains a 1 and stores the next text byte captured in register 104 into byte 1 of word 2. Each successive service in/service out tag sequence up to the fourth text byte, stores data in consecutive bytes of word 2. The fifth text byte is stored in byte 0 of word 3 of that region of working storage and so on. Each time the byte counter is advanced, it points to the next byte in a word. The MPX control 51 captures and stores text data in the region associated with that device. A working storage region contains two words with 8 bytes of text, one word having I time (initial time) and word 0 reversed for the command, control and byte count information.

In the foregoing discussion, it was assumed that service in/service out tags came one after another. It is possible for the service in/service out tag to have occurred and then the channel disconnect from the device. It is now possible to communicate with another device which may have a different text byte of data. When disconnect occurs, the accumulated information for that device must be saved. The unit address is used to store command, control and byte counter information into word 0 of the unit address region and once done, clear all registers. Working storage has the command, the control and the byte count, initial time plus whatever text has been accumulated to that point. If data is available for another device, the multiplex controls 51 accesses that unit's region in storage and performs an update on the byte count, traps the text and stores the information back into the region. Eventually another text byte is available for the first region in which case, the unit address is used to access word zero. Word zero contains the command, the control and the byte count. The text byte being sent to that device is captured in register 104 and stored in the correct byte location. The operation continues between regions in this manner for as many devices as necessary.

In summary, there is a unique region where the apparatus can accumulate the data and retrieve it when needed. Eventually one device will complete its transaction and present a status in tag. When non-zero status is returned by the device, the apparatus retrieves the command, control and byte count information from the associated region of working storage and transfers it to the appropriate word buffers 54, 58, 63, 67, 68 and 69 in FIG. 3. In effect what the apparatus has done is accumulate information in working storage in a reserved region for every possible device that can be attached to a multiplexer channel and at any instant of time, is able to call out a particular region of storage, update it, return it back to storage and at the end of the sequence, when non-zero status is presented, fetch everything out of storage and load it into the word buffers for eventual output to tape.

The word buffers 54, 58, 63, 67, 68, and 69 are similar to the selector channel of FIG. 2. They provide the temporary storage before or prior to going to the shift register. The word multiplexer output registers are output 70 and the CUMPAS word bus drivers 71 are identical to the selector channel — they provide a method of sharing a common bus from all the channels to the shift register. Selection of a particular channel is accomplished through the word multiplexer block 70 to the channel enable signal which is under control of the CUMPAS system control logic.

FIG. 4 illustrates the profile channel of CUMPAS, input number 4. It is unlike the selector or multiplexer channel inputs; it does not receive data from a T box. It contains eight counters, counters 75, 76, 77, 78, 79, 80, 81, 82. These eight counters are connected directly to a plug-board which receives data signals from probes. These probes can be physically located anywhere in the CPU or I/O of the host system. Probe signals brought into the plugboard can be combined logically to count or time in the eight counters, different events to obtain profile information. This channel has a 12 bit live register 73 associated with it, an ID register 74 which, in this case, indicates the record was created by the profile channel and not a multiplexer or selector channel for software reduction purposes.

When a profile record is created, the time of day clock is sampled and appears in word 1 of the profile output record. When a record is demanded or read from profile area, the counters no longer receive inputs and are frozen. When the CUMPAS system control logic honors the profile priority, it transfers the information from the counters and the live register. After this is completed, the counters are enabled and start counting and timing.

Output from the profile section can be demanded from the plugboard at certain times, or forced to occur whenever any counter overflows. The counters can be reset after read out or the counters can be allowed to accumulate after read out, optional on the plugboard. When an overflowing counter causes a profile readout, that counter is so identified in the counter overflow register 72.

CUMPAS word drivers 84 places profile data onto the common bus. Profile information is enabled on the common bus by the enable channel signal.

Figure 5:
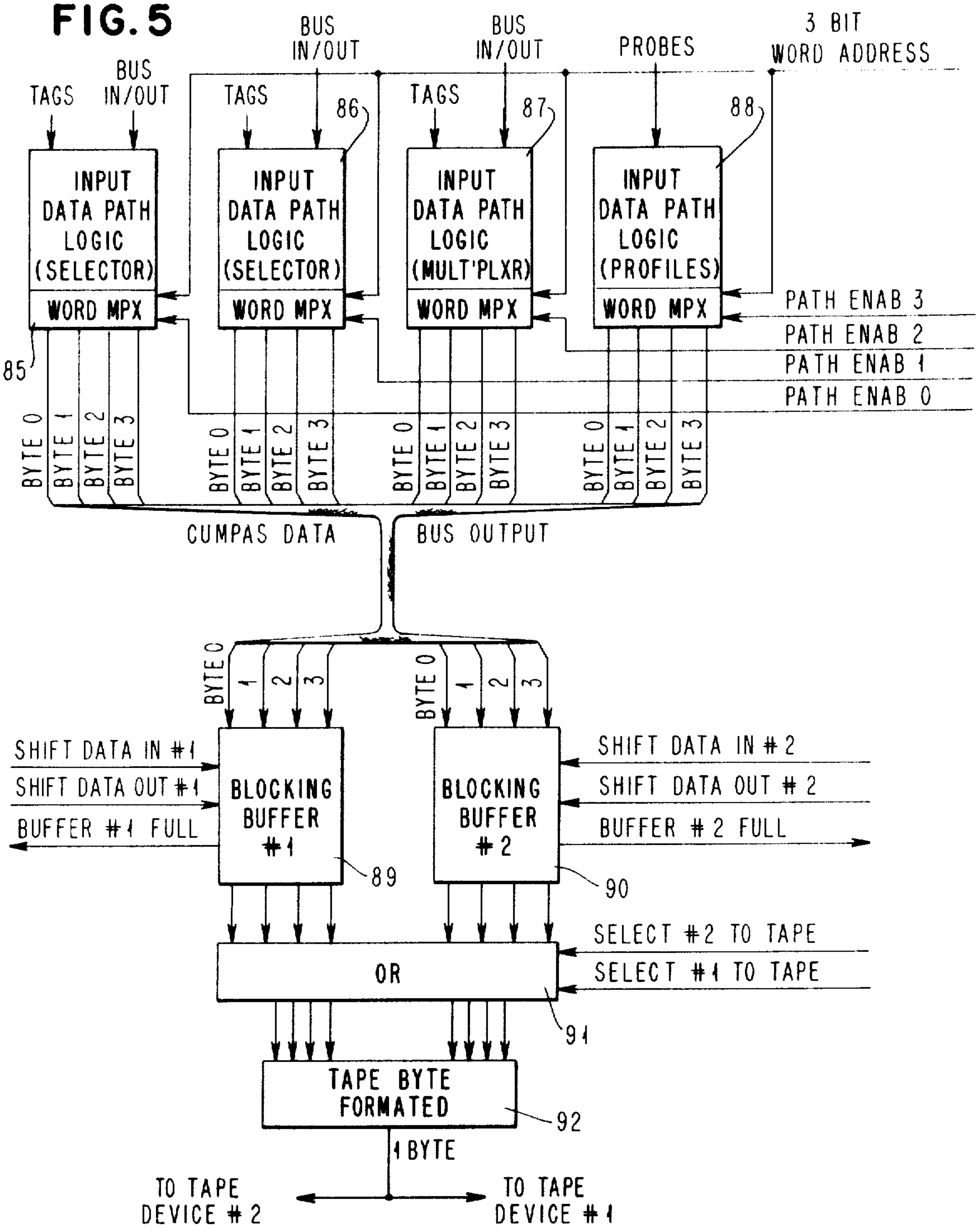
FIG. 5 is a diagram of the data flow of CUMPAS.

FIG. 5 illustrates the full CUMPAS data flow from each of the four channels through the word multiplexer, four inputs 85, 86, 87, and 88. Each channel has an output dot ORed onto the CUMPAS data bus output. A particular channel on that bus is enabled by a signal labeled path enable 0, 1, 2 and 3.

Input data path logic for selector channels blocks 85, 86 are represented by FIG. 2. Input data path logic for multiplexer channels block 87 shown in FIG. 3 and the input data path for the profile is shown in FIG. 4.

Each channel is unique and can drive this bus if it receives a path enable signal. The CUMPAS data bus output drives two blocking buffers, 89 and 90. The blocking buffers FIFO shift registers are capable of storing 500, 36 bit words. Each 36 bit word is parallel loaded into the shift register. Each additional 4 byte word is shifted into the first location and the first location will go to the second and so on. Two 500 word shift registers are used so that one can be emptying while the other is filling up. This ensures there is an area available in which blocked records can be assembled for tape.

For example, assume that block 85 the first selector channel data path has a six word record available. Blocking buffer number 1, 89, is selected. Shifting on a word by word basis, 6 shift pulses shift the 6 words into consecutive sequential positions in blocking buffer 1.

Next a profile read out enables path 3, and six words are shifted into blocking buffer 1 which now contains 12 words or two records of data from two different channels. The shifting continues, observing priorities from the different input logic paths. Eventually a total of 500 words will shift into blocking buffer 1, 89. At this point, blocking buffer 1, 89, gives a full indication. This full signal switchs blocking buffer 1 into a read and sets blocking buffer 2 into a write. The next word or next record that is sent to the shift registers would now start to fill up blocking buffer 2, 90. In the meantime, blocking buffer 1 having set a full indication is emptied to the tape device at the tape rate. This can take place independently of blocking buffer 2. Thus, one buffer is in the read mode while the other is writing data or vice-versa. The CUMPAS system control logic determines when a buffer is full, when it should be read to tape, when to put it in the write mode, and when to retrieve information from the channel input path.

Now we have a condition where two buffers can be full. This is a tape overrun. It occurs when buffers fill up faster than it can be unloaded. This condition is indicated on a control panel since data is lost during this period. This is called the buffer overflow.

When a blocking buffer accumulates 500 word of information, it is full. The combinations of 6 word and 4 word records usually do not total up to a perfect 500 word record so when the 492nd word is in a shift register, a padding latch is enabled. This latch allows the record being written into the blocking buffer to be padded from that point until a full condition occurs. The padding makes the record an even 500 words. Padding insures no split records.

Each channel has an identification code and within this ID code, there are two bits indicating record length. A record whose length code is equal to a 11 indicates those words are pad characters and do not have any significance for data reduction purposes.

Once a blocking buffer is full (FIG. 5), OR gate 91 selects either blocking buffers 1 or 2 depending on which one is full. Assuming shift register 2 is full, "select No. 2 to Tape" line is energized at OR gate 91 and bytes are shifted out of gate 92 to one or the other tape device. When one tape becomes full, it automatically switches to the second tape and the first tape goes into rewind mode. This allows the operator to rewind one tape while another tape is being recorded.

Figure 6:
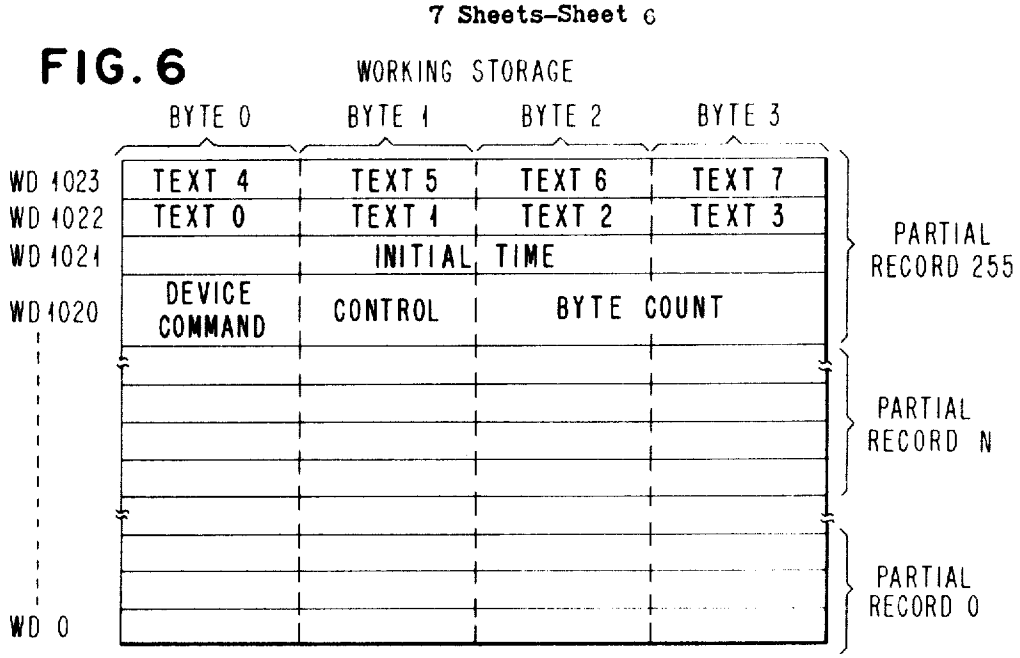
FIG. 6 is a table showing the configuration of the working storage of CUMPAS.

FIG. 6 indicates the configuration of the working storage for the multiplexer channel. FIG. 6 is a graphic illustration of the regions within storage. To illustrate, device 255 is assigned a region shown by brackets in FIG. 6. Device 255 captures data contained in partial record 255 which is comprised of four words 1020 – 1023. Note the first word, word 1020 contains four bytes of information. Byte 0 of word 1020 contains a device command, byte 1 contains a control field explained during discussion of the individual input paths in CUMPAS. Bytes 2, 3 word 1020 contains the byte count which is 2 bytes long giving us a total binary count of 64K and when it overflows, one of those control bits in byte 1 is set. The second word is partial record 255 is initial time, 4 bytes. In word 1022 the first byte is TEXTO, the second byte is TEXT1, TEXT2 and the TEXT3, the last byte. These are the first four text bytes captured during a transaction. The next four bytes would be located in word 1023. Byte 0 contains TEXT4 and so on up to byte 3 which contains TEXT7. Visualize this memory with many devices operating, there is a possibility of having up to 255 of these partial records throughout working storage.

Anyone of these devices when started in the transaction could receive a device end or non-zero status in which event, the particular partial record unique to that device will be retrieved from memory. These four words contain all the information captured thus far for a particular device.

FIG. 9 is an illustration of the profile record. The profile path, unlike the selector and multiplexer, generates a different format than the other three inputs. The profile path contains 8 counters. It would have these 8 counter values shown as a six word record. These values are contained in words 2 – 5. Tape word 1 for profile read out is final time. This is a time stamp indicating when a profile record was read out of the profile input path. Tape word 0, byte 0, is the counter overflow indication. When a counter overflows a profile record is read out, and in byte 0, tape word 0, one of 8 bits is set to a 1 indicating which counter caused the overflow.

The next byte contains length and always alwayss a six word record. The channel identification will be a 11 indicating profile record has been created. The live register is contained in 12 bits at the same location as the selector and multiplexer live register contents, see FIG. 7 live register contents located in bits 12 through 23. One additional byte of data bits 24 to 31 of word 0 of the profile record is high time. High time is a 5th byte, essentially overflow from the 4 bytes of the time of day clock internal to CUMPAS. The CUMPAS internal clock has a total of 31 binary bits and updates at a 1 microsecond rate. Approximately every 1.3 hours, the output of the 4th byte will overflow into the 5th byte. This 5th byte is called "High time". The contents of this are updated every overflow out of the four low order bytes of time — time of day clock. This byte of time is contained in the 24 through 31 of tape word 0. It provides a method of keeping track of records over a 24 hour period of time. High time overflows after 10 days.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A computer monitor capable of capturing information sent between a central processing unit and input/output (I/O) devices comprising:

means for time stamping and formatting captured information with indicia such as command control, status, data transfer count and test information; and a format storage medium which is segmented into n storage partitions, each storage partition associated with one I/O device, to thereby reserve the nth partition exclusively for the *n*th I/O device; each partition having sufficient storage space to store said indicia relating to the *n*th I/O device.

2. For use with a computer system in which a central processing unit (CPU) and a data channel are connected to I/O devices over an input/output interface, a program monitor comprising:

means for capturing data and commands passing over said interface;

means for time stamping, formatting and transferring said captured information to a format storage; said format storage segmented on a one-for-one basis with each I/O device; and means for counting the captured data in each format storage segment, tagging said data for identification and recording said data on a storage medium whereby later performance analysis can be performed.

3. The combination according to claim 2 including means for collecting data from both the CPU and the I/O interface simultaneously.

4. An input/output monitor for monitoring an I/O interface comprising:

a channel input data path connected to said I/O interface; and means in said channel input for interpreting tag signals and for capturing bus information in registers, including control logic responsive to said tag signals for interpreting said tag signals, selecting either an input or an output bus, and strobing into or out of appropriate ones of said registers for capturing information on said bus.

5. An input/output monitor for monitoring an I/O interface comprising:

a channel input data path connected to said I/O interface;

a profile input data path connectable to monitor probes attachable to a CPU, control unit or device;

means in said channel input for interpreting tag signals and for capturing bus information in registers, including control logic responsive to said tag signals for interpreting said tag signals, selecting either an input or an output bus, and strobing into or out of appropriate ones of said registers for capturing information on said bus; and means in said profile input for interpreting events to obtain profile information, including means for time-stamping said information for correlation with information captured by said channel input.

6. For use with an input/output interface in which control sequences are signalled by use of tags said interface connected between a central processing unit (CPU) and input/output devices, a monitor comprising:

a T box in series with the I/O interface connecting said control units;

means in said T box for sensing tags and for transmitting said tags to said monitor;

control logic means in said monitor for interpreting said tags as an initial selection mode;

a bus out receiver;

a unit address register;

means responsive to said control logic for selecting said out bus receiver; and means for transferring the data from the bus out to the unit address register whereby the unit address or device address appearing on bus out is captured in said register.

7. The combination according to claim 6 including further means in said control logic for interpreting command out by strobing a command register and selecting the bus out receivers whereby the channel command is captured.

8. The combination according to claim 7 wherein said control logic contains means responsive to presentation of status in on the bus in receivers to transfer to a status register status information appearing on bus in.

9. The combination according to claim 8 wherein said control logic includes means responsive to read or write data transfer tags and said command register for selecting bus in or bus out to thereby transfer data to word buffers.

10. The combination according to claim 9 wherein means are provided for capturing a predetermined number of bytes and further means are provided for counting the total number of bytes transferred to a particular device in addition to the actual bytes recorded.

11. The combination according to claim 10 wherein a time of day bus is sampled to thereby mark and time stamp the beginning of a transaction in response to the initial selection sequence.

12. The combination according to claim 11 including means responsive to the end of a transaction as indicated by a non-zero status response to thereby mark and time stamp the end of a transaction by transferring the time of day bus into a word buffer.

13. A monitor for use with and attachment to an I/O interface connecting a processor with I/O devices, said interface of the interlocked demand-response type wherein in-tags and out-tags specify the nature of an operation and data, address, command and status information relating to said tags is placed on in or out buses, comprising:

a working storage, including a unique region for a particular I/O device wherein data and control information can be stored;

means responsive to the selection of said particular I/O device by said interface for reading out the contents of said region, updating said contents, and returning said contents to storage; and means responsive to the termination of an I/O operation with respect to said particular device as signalled by status information over said interface for reading out the contents of said unique region to a storage media.

14. The combination according to claim 13 wherein said reading means includes means responsive to a device address appearing at said interface for capturing said address and using said address as the region address for addressing said working storage.

15. The combination according to claim 2 wherein said capturing means includes means for registering *n* bytes of data, and said counting means includes means for selectively inhibiting or not inhibiting the collection of data after a count of *n* is reached, to thereby selectively capture either the first *n* bytes of data or the last *n* bytes of data, respectively.

* * * * *